United States Patent [19]

Gallagher

[11] Patent Number: 4,838,055

[45] Date of Patent: Jun. 13, 1989

[54] ANTI-THIEF KEY LOCK FOR VENDING MACHINES

[76] Inventor: Francis E. Gallagher, 1470 E. Old Badillo, Covina, Calif. 91724

[21] Appl. No.: 189,020

[22] Filed: May 2, 1988

[51] Int. Cl.[4] ........................ E05B 29/04; B60R 25/02

[52] U.S. Cl. ........................................ 70/208; 70/366; 70/417

[58] Field of Search ................. 70/208, 417, 366, 365; 292/138, 140, 149, DIG. 51

[56] References Cited

U.S. PATENT DOCUMENTS

| | | | |
|---|---|---|---|
| 615,207 | 11/1898 | Babcock | 70/366 |
| 1,306,386 | 6/1919 | Malone | 292/DIG. 51 |
| 1,819,813 | 8/1931 | Ellenberger | 70/208 |
| 3,089,330 | 5/1963 | Kerr | 70/208 |
| 3,204,438 | 9/1965 | Sollenberger | 70/917 |
| 3,695,073 | 10/1972 | Prescott | 70/366 |
| 4,062,211 | 12/1977 | Miller | 70/366 |
| 4,195,503 | 4/1980 | Roberts | 70/366 |

*Primary Examiner*—Robert L. Wolfe

*Attorney, Agent, or Firm*—Boniard I. Brown

[57] ABSTRACT

A key lock having a hardened steel plug that protects the internal tumblers from attack by vandals or thieves. The lock includes a high strength locking bolt that is biased to its latching position by a novel coil spring; a stabilizer rod extends within the spring to prevent lateral buckling of the spring convolutions.

8 Claims, 2 Drawing Sheets

FIG. 1
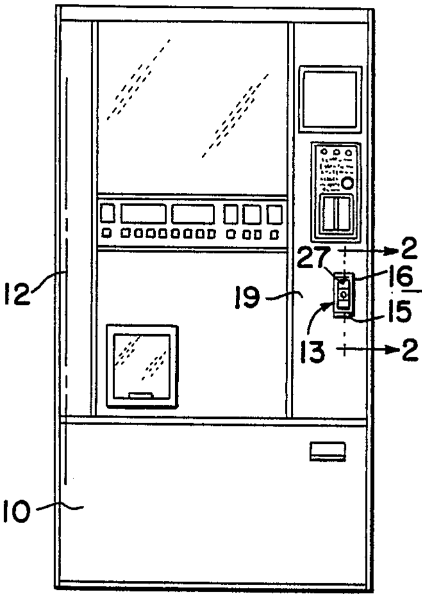
FIG. 2
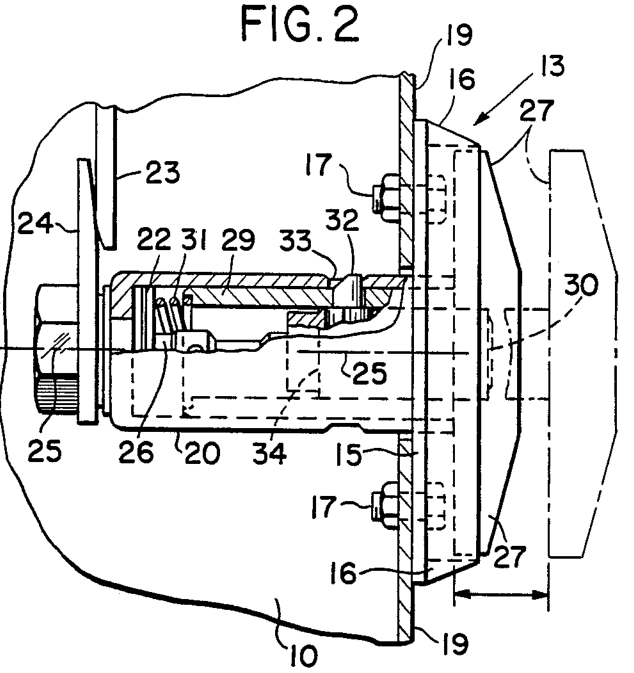
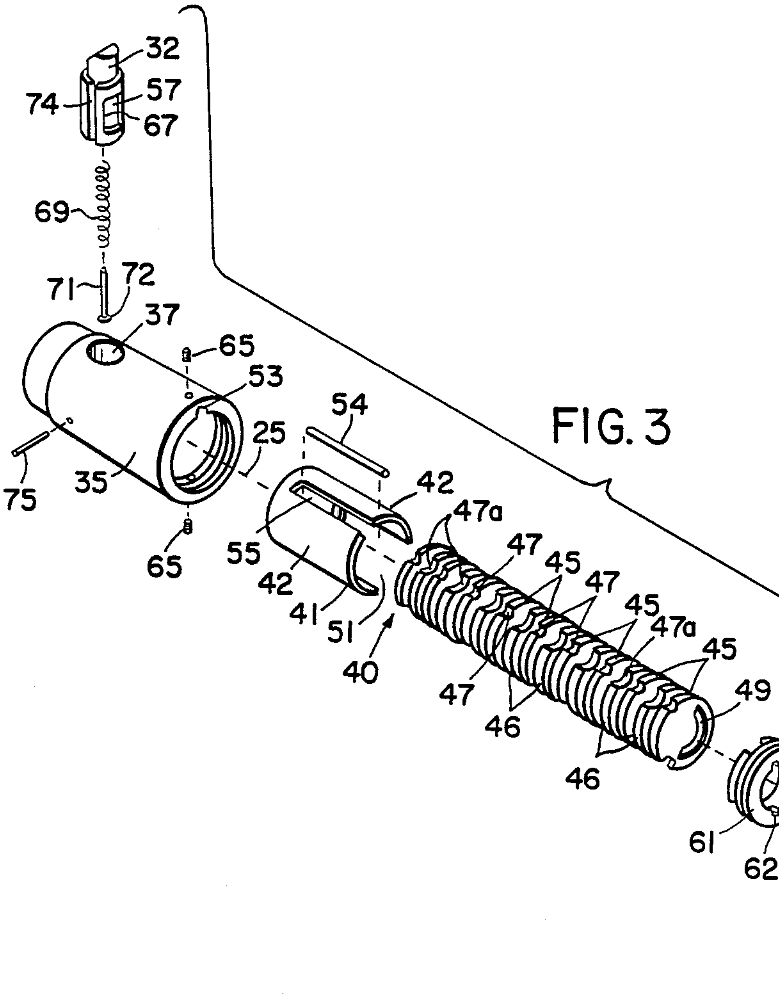
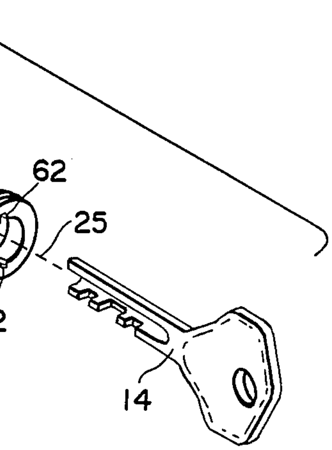
FIG. 3
FIG. 8
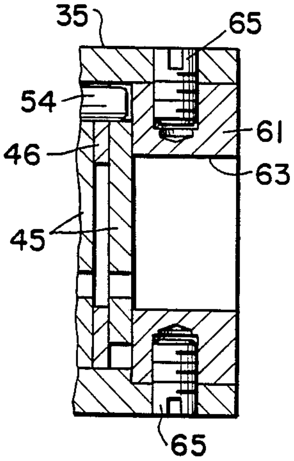

ANTI-THIEF KEY LOCK FOR VENDING MACHINES

BACKGROUND OF THE INVENTION

This invention relates to key locks, especially locks designed for use in coin-operated vending machines.

Coin-operated vending machines usually comprise upright cabinets measuring about six feet high and three feet wide. Food items, e.g. candy bars and bags of potato chips, are stored in rows on shelf units within the cabinet. The entire front wall of the cabinet is a door unit that is openable for replenishment of the food items and collection of monies.

In one current vending machine construction the door unit has a key-operated lock mechanism located within a pop-out handle structure. When the key is turned a predetermined amount the handle structure pops out of a recess in the door front wall, whereby the handle can be turned to unlock the door. The key can be turned a further amount to separate the lock from the handle structure, e.g. to replace the lock and/or lock tumblers.

SUMMARY OF THE INVENTION

My invention concerns improvements in barrel locks, especially barrel locks used in the above-described vending door lock mechanism.

One object of my invention is to provide a barrel lock whose exposed end face is defined by a thick annular plug, preferably formed of case hardened steel or other ballistic material. The aim is to protect the lock tumblers from drilling forces or other destructive attacks by thieves.

Another object is to provide a barrel lock wherein the locking bolt has a relatively high shear strength, e.g. at least 3000 pounds.

A further object is to provide a barrel lock wherein the locking bolt is biased to its latching position by a strong durable spring mechanism. A related object is to include a rod type spring stabilizer that will prevent the spring from prematurely distorting or buckling.

THE DRAWING

FIG. 1 is a front view of a coin-operated vending machine which can utilize my invention.

FIG. 2 is an enlarged fragmentary view taken on line 2—2 in FIG. 1.

FIG. 3 is an exploded perspective view of key lock components utilized in a lock structure depicted in FIG. 2.

FIG. 8 is a fragmentary section view taken in the same direction as FIG. 5, but illustrating an alternate structural detail that can be used in practicing the invention.

DESCRIPTION OF A PREFERRED EMBODIMENT OF THE INVENTION

Figure 4:
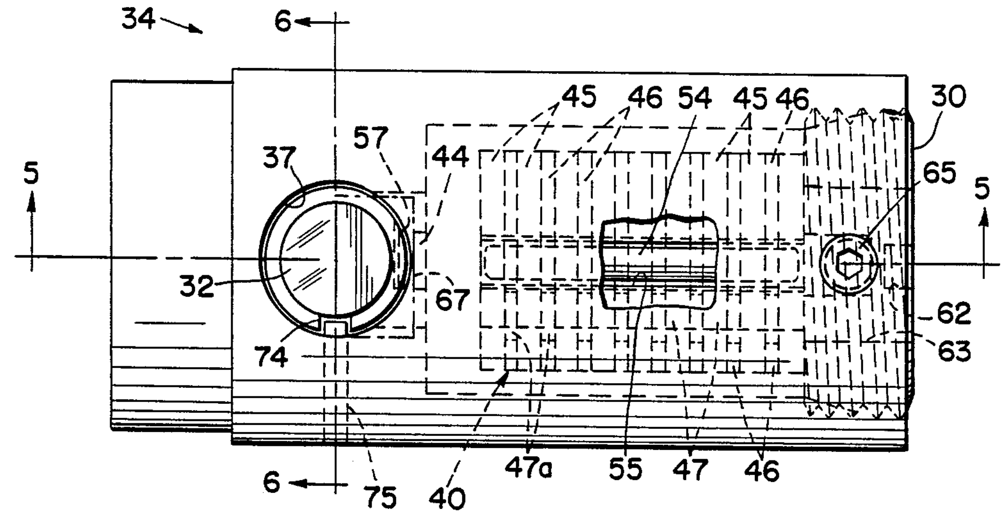
FIG. 4 is top plan view of the FIG. 3 lock structure after assembly of the lock components.

FIG. 1 shows a conventional coin-operated vending machine having a full length door unit 10 swingable on a hinge axis 12 to expose the machine cabinet interior to the serviceman (for replacement of the vended commodities and withdrawl of deposited monies). A lock mechanism 13 is carried on the door to prevent its being opened except by a person having the correct key 14 (FIG. 3).

The lock mechanism comprises a face plate 15 having a peripheral flange 16; bolts 17 or other equivalent means secure plate 15 against the front wall 19 of door 10. A tubular housing 20 extends rearwardly from face plate 15.

A rotary locking structure 22 is mounted in the rear section of housing 20 for latching engagement with a stationary keeper plate 23 suitably anchored within the vending machine cabinet. Locking structure 22 includes a vertical locking plate 24 designed to swing around horizontal axis 25 for engagement with (or disengagement from) stationary plate 23.

The locking mechanism further includes a solid bar-type handle 27 normally retracted into the space circumscribed by aforementioned flange 16. A cylindrical carrier 29 extends rearwardly from handle 27 as a slip fit within housing 20. Carrier 29 can rotate and/or slide axially within housing 20. A compression spring 31 is trained against the rear end of carrier 29 to bias the carrier (and associated handle 27) to an extended position, as illustrated by the dashed lines in FIG. 2. Spring 31 becomes effective only when locking bolt 32 is retracted downwardly out of latch opening 33 in housing 20.

My invention relates particularly to a barrel-type key lock 34 disposed within carrier 29. A key 14 (FIG. 3) can be inserted into the right end face 30 of lock 34 and turned around axis 25 to retract bolt 32 out of latch opening 33, thereby permitting spring 31 to move handle 27 out of the space circumscribed by flange 16. Handle 27 can then be turned around axis 25 to rotate locking plate 24 out of engagement with keeper plate 23. Locking structure 22 includes an axial rod 26 that extends into a socket in the end wall of key lock 34, whereby the key lock transmits a rotary driving force from handle 27 to locking structure 22.

Key 14 can be turned a further amount to fully retract bolt 32 into the key lock 34 case, thereby enabling the key lock to be removed from carrier 29, e.g. for lock replacement purposes.

FIGS. 3 through 7 illustrate the general structure of key lock 34. The lock comprises a cylindrical case 35 having a cylindrical cavity 36 centered on horizontal axis 25. A transverse cylindrical bore 37 extends downwardly from the cylindrical side surface of the case on a vertical axis 39. Bore 37 slidably supports (guides) aforementioned locking bolt 32.

A key-operated tumbler means 40 is disposed within cavity 36. The tumbler means comprises a hollow carrier 41 that includes two cylindrical segmental walls 42 and a flat circular end wall 43. A crank pin 44 extends rearwardly from wall 43.

Figure 7:
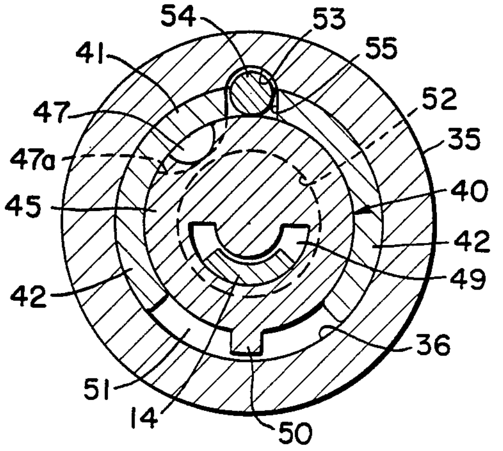
FIG. 7 is a sectional view on line 7—7 in FIG. 5.

Tumbler means 40 also comprises nine tumbler disks 45 and eight intervening spacer disks 46. Each tumbler disk has a peripheral notch 47 and key slot 49 (FIG. 7). With the exception of the first tumbler disk, each tumbler disk has a radial tab (arm) 50 extending into axial space 51 formed between the lower edges of segmental walls 42.

Each spacer disk 46 is an annular disk whose outer diameter fits within the space circumscribed by segmental walls 42. Each spacer disk has a tab dimensioned to fit into space 51, whereby each spacer disk is prevented from rotating relative to carrier 41. The inner diameter of each annular spacer disk is designated by number 52 (FIG. 7). Each spacer disk has a notch 47a at the twelve o'clock position.

Case 35 has an axial groove 53 in the roof area of cavity 36. An elongated bar 54 is normally disposed partly within groove 53 and partly within a groove 55 formed in carrier 41 (between walls 42). When key 14 is operated to turn tumbler disks 45 clockwise (FIG. 7) notches 47 move into registry with groove 55. Bar 54 shifts downwardly out of groove 53 into a position disposed partly within groove 55 and partly within notches 47 and 47a. Further clockwise rotation of key 14 causes carrier 41 and the two sets of disks (45 and 46) to rotate as a unit; bar 54 acts as a drive bar to transmit the drive force from disks 45 to carrier 41.

Disks 45 are manufactured so that notches 47 in the different disks have different circumferential locations (closer to or further away from the twelve o'clock position). The notch locations are related to the respective dimensions of key 14 formed by circumferential cuts in the left edge of the key. The key engages the end of each slot 49 at a different point in time, whereby notches 47 simultaneously arrive at positions in registry with groove 55.

Clockwise rotation of carrier 41 causes crank pin 44 to move from the full line position (FIG. 6) to dashed line position 44a. Pin 44 exerts a downward force on the lower edge surface of a slot 57 formed in a side surface of bolt 32; bolt 32 moves downwardly through a stroke distance 59. Key 14 can be operated to rotate carrier 41 further, such that pin 44 moves to position 44b; bolt 32 will then have undergone a stroke distance 60.

Stroke distance 59 is sufficient to withdraw bolt 32 out of latch opening 33 (FIG. 2) in housing 20. Stroke distance 60 is sufficient to withdraw bolt 32 out of latching engagement with carrier 29.

Key 14 cannot be withdrawn from slots 49 when bolt 32 is in either of its retracted positions. The cuts in the left edge of key 14 interact with the face areas on a adjacent disks 45 to prevent withdrawal of the key from slots 49. Key 14 must be rotated in counterclockwise direction to return bolt 32 to its extended position before the key can be withdrawn from slots 49.

FEATURES OF THE INVENTION

Figure 5:
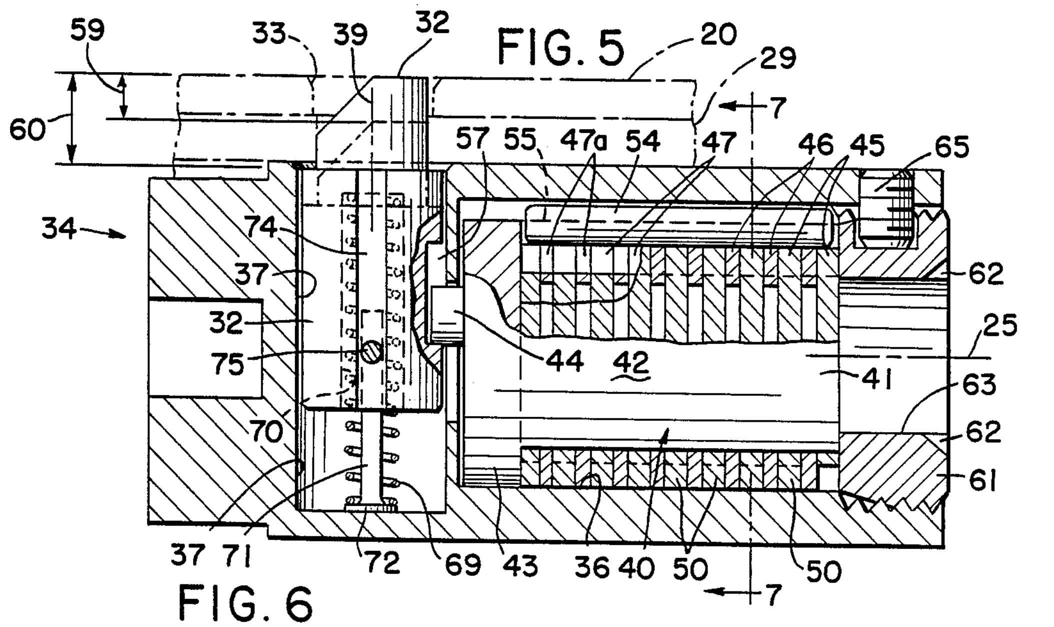
FIG. 5 is a sectional view taken on line 5—5 in FIG. 4.

FIG. 5 shows an annular plug 61 inserted into the mouth of case cavity 36. Screw threads are formed on the plug and cavity surfaces, whereby the plug can be screwed into the cavity to overlie the first tumbler 45; screw driver slots 62 facilitate a screw action. The diameter of inner plug surface 63 is only slightly greater than the corresponding dimension of key slot 49; numeral 52 in FIG. 7 shows the location of plug surface 63 relative to slot 49 and tumbler notches 47.

Plug 61 overlies the tumblers to protect them from destructive attack by drilling. Preferably plug 61 is formed of case hardened steel or other ballistic material, e.g. ceramic, laminated composites or depleted uranium. One or more hardened steel set screws 65 are threaded into aligned openings in the case 35 side wall and the outer edge surface of plug 61. After the key lock is installed in carrier 29 (FIG. 2) the set screws 65 are concealed from view, hence inaccessible to potential thieves.

Plug 61 is preferably a relatively thick component offering substantial resistance to destructive attack. The axial thickness of plug 61 preferably is at least thirty percent of the plug diameter.

FIG. 8 illustrates variant of the invention wherein plug 61 has a slip fit in a smooth-surfaced counter bore in the mouth of the case cavity. Set screws 65 are the sole mechanisms for retaining plug 61 in case 35. The plug can be removed from case 35 after the key lock is withdrawn from carrier 29, e.g. when it is desired to change key 14 and the associated tumblers 45.

To augment the protective action of plug 61 the first tumbler 45 may be a hardened steel disk formed without a projecting tab 50. The first tumbler is thus capable of spinning when it is contacted by a high speed drill. A spinning tumbler disk relieves the cutting force while dulling the drill.

Locking bolt 32 is preferably a high strength component of substantial diameter; shear strength in excess of 5000 pounds is possible. The diameter of bolt 32 is preferably about forty percent of the case 35 diameter.

The strength of bolt 32 is somewhat enhanced by the fact that slot 57 is milled only part way across the bolt side surface. The left edge of the slot terminates in a shoulder 67 extending parallel to bolt axis 39. The bolt surface to the left of shoulder 67 remains unslotted, which helps to maintain a high bolt shear strength.

The bolt strength is also enhanced by the long bolt length. The bolt is almost as long as the axial depth or bore 37. The long bolt length is made possible by the fact that coil spring 69 is located within a blind hole 70 in bolt 32. When the bolt is fully retracted into bore 37 the bolt lower end can be very close to the bore bottom surface because spring 69 does not take up any space below the bolt lower end. Bolt 32 can be a relatively long component, with advantages as regards strength, wear and smooth guidance operation.

Blind hole 70 is preferably a long hole having a length at least fifty percent of the bolt 32 length. As shown in FIG. 5, hole 70 has a length about seventy percent of the bolt 32 length. The long hole length is advantageous in that it permits the use of a long compression spring 69. A long spring is desirable in that spring deflection is low in relation to spring length; each convolution deflects only a small amount, with resultant advantages in regard to spring life.

The relatively long spring 69 is stabilized against lateral bending or buckling by means of a stabilizer rod 71. A flange 72 at the lower end of the rod underlies the end convolution of the spring to retain the rod in a desired position effective for spring stabilization purposes.

Bolt 32 preferably has an axial groove 74 in its side surface. A guide pin 75 extends through a side wall of case 35 into the axial groove, thereby preventing bolt 32 from rotating. Groove 74 is a relatively thin groove that subtracts comparatively little from bolt strength.

Figure 6:
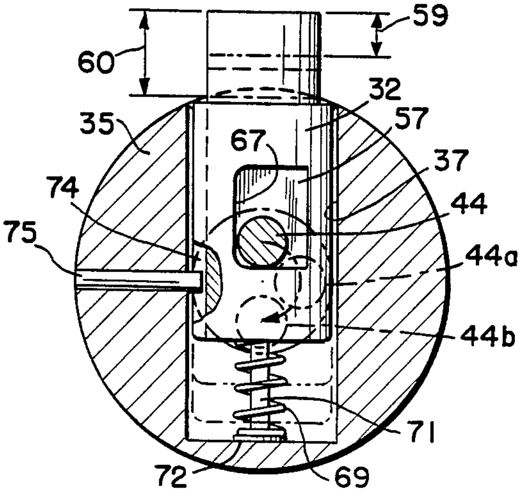
FIG. 6 is a sectional view taken on line 6—6 in FIG. 4.

The aforementioned shoulder 67 (at the left edge of slot 57) functions as a stop for crank pin 44; the pin is precluded from counterclockwise movement beyond the FIG. 6 full line position. Tumbler carrier 41 is thus automatically adjusted to a position wherein groove 55 (FIG. 7) registers with groove 53. The result is a smooth jam-free action of the various components that form the tumbler mechanism and motion-transmitting connection (between carrier 41 and bolt 32).

The drawings show a specific embodiment of the invention. However it will be obvious that some structural variations may be made while practicing the invention and obtaining the various noted operational improvements.

I claim:

1. A key lock comprising a cylindrical case having a cylindrical cavity extending from one of its end faces, and a bore extending from a side surface thereof at right angles to the cavity, key-operated tumbler means rotatably disposed within the cavity, a locking bolt slidably disposed within the bore for rectilinear motion along the bore axis, motion-transmitting means interconnecting the tumbler means and locking bolt, whereby rotation of the tumbler means produces slidable motion of the bolt, an annular plug having a screw bit in the mouth of the case cavity to overlie the tumbler means, said annular plug having an axial thickness that is at least thirty percent of the plug diameter, and a set screw extended radially through a cylindrical wall of the case into a blind hole in the annular plug to prevent removal of the plug out of the cavity.

2. A key lock comprising a cylindrical case having a cylindrical cavity extending from one of its end faces, and a bore extending from a side surface thereof at right angles to the cavity, key-operated tumbler means rotatably disposed within the cavity, a locking bolt slidably disposed within the bore for rectilinear motion along the bore axis, motion-transmitting means interconnecting the tumbler means and locking bolt, whereby rotation of the tumbler means produces slidable motion of the bolt, an annular plug insertable into the mouth of the case cavity to overlie the tumbler means, and a set screw extended radially through a cylindrical wall of the case into a blind hole in the annular plug to prevent removal of the plug out of the cavity, said motion-transmitting means comprising a crank-pin extending from the tumbler means, and a slot formed in a side surface of the bolt, said locking bolt having a cylindrical cross section, said slot terminating in a shoulder extending parallel to the bolt axis, said crank pin extending into the slot so that in the locked condition of the tumbler means the pin is engaged with the shoulder.

3. The key lock of claim 2, wherein:

the cylindrical bolt has an axial groove in it side surface, and a guide pin extending through a side wall of the case into the axial groove to prevent bolt rotation.

4. The key lock of claim 2, wherein:

said locking bolt has a blind hole extending from the end thereof located within the bore, a coil spring extending within said blind hole for biasing the bolt toward its extended position, and a spring stabilizer rod extending within the spring, said rod having a flange seated on an internal end face of the case bore to underlie an end convolution of the coil spring.

5. The key lock of claim 4, wherein:

the locking bolt has a diameter that is approximately forty percent of the case diameter.

6. The key lock of claim 4, wherein:

the blind hole in the locking bolt has a length that is at least fifth percent of the bolt length.

7. In combination, a hollow annular carrier and a key lock removably disposed within the carrier, said key lock comprising a cylindrical case having a cylindrical cavity extending from one of its end faces to define a mouth opening therein, and a bore extending from a side surface thereof at right angles to the cavity, key-operated tumbler means rotatably disposed within the cavity, said tumbler means defining a key slot accessible through the mouth opening, a locking bolt slidably disposed within said bore for rectilinear motion along the bore axis, motion-transmitting means interconnecting the tumbler means and locking bolt, whereby rotation of the tumbler means produces slidable motion of the bolt, an annular plug insertable through the mouth opening of the case cavity to overlie the tumbler means, and a set screw extended radially through a cylindrical wall of the case into a blind hole in the annular plug to prevent removal of the plug out of the cavity, said set screw being located within the space circumscribed by the hollow annular carrier when the key lock is disposed therewithin, said hollow annular carrier having an opening therein alignable with the locking bolt, whereby complete retraction of the bolt into the cylindrical case permits removal of the key lock from the carrier.

8. The combination of claim 7, wherein the annular plug is formed of a ballistic material.

* * * * *